(12) United States Patent
Ogawa (10) Patent No.: US 10,606,233 B2
(45) Date of Patent: Mar. 31, 2020

(54) MACHINE LEARNING APPARATUS THAT LEARNS SETTING VALUE IN MACHINING PROGRAM OF MACHINE TOOL, AND MACHINING SYSTEM

(71) Applicant: FANUC CORPORATION, Yamanashi (JP)

(72) Inventor: Kenichi Ogawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 272 days.

(21) Appl. No.: 15/729,801

(22) Filed: Oct. 11, 2017

(65) Prior Publication Data
US 2018/0107947 A1 Apr. 19, 2018

(30) Foreign Application Priority Data
Oct. 18, 2016 (JP) ................. 2016-204538

(51) Int. Cl.
| | | |
|---|---|---|
| G05B 19/18 | (2006.01) | |
| G06N 20/00 | (2019.01) | |
| G06N 3/08 | (2006.01) | |
| B23Q 15/12 | (2006.01) | |
| B23Q 15/18 | (2006.01) | |

(52) U.S. Cl.
CPC .............. *G05B 19/18* (2013.01); *B23Q 15/12* (2013.01); *B23Q 15/18* (2013.01); *G06N 3/08* (2013.01); *G06N 20/00* (2019.01)

(58) Field of Classification Search
CPC ...... G05B 19/18; G06N 20/00; B23Q 15/013; B23Q 15/12; B23Q 15/18
See application file for complete search history.

(56) References Cited

U.S. PATENT DOCUMENTS

| | | | | |
|---|---|---|---|---|
| 5,523,953 A | * | 6/1996 | Araie | ................... G05B 19/404 700/193 |
| 9,002,502 B2 | * | 4/2015 | Matsushita | .......... B23Q 1/5406 318/569 |
| 2015/0125303 A1 | * | 5/2015 | Masakawa | .............. B23P 15/02 416/185 |

FOREIGN PATENT DOCUMENTS

| | | |
|---|---|---|
| CN | 102455682 A | 5/2012 |
| CN | 102736557 A | 10/2012 |
| CN | 102736559 A | 10/2012 |
| CN | 103576610 A | 2/2014 |
| JP | S61-38537 U | 3/1986 |
| JP | H3-208540 A | 9/1991 |
| JP | H7-75937 A | 3/1995 |
| JP | 07-164199 A | 6/1995 |
| JP | 2004-148422 A | 5/2004 |
| JP | 4358705 B2 | 11/2009 |

(Continued)

*Primary Examiner* — Benjamin P Geib
(74) *Attorney, Agent, or Firm* — Hauptman Ham, LLP (57) ABSTRACT

A machine learning apparatus learns a setting value in a machining program of a machine tool configured to machine an impeller. The machine learning apparatus includes a state observation unit configured to acquire the thermal displacement amount during a period of machining a workpiece, as a state variable, and a determination data acquisition unit configured to receive the imbalance amount in the impeller after machining as determination data. The machine learning apparatus includes a learning unit configured to learn the setting value in the machining program on the basis of output from the state observation unit and output from the determination data acquisition unit.

6 Claims, 9 Drawing Sheets

(56) References Cited

FOREIGN PATENT DOCUMENTS

| | | | |
|---|---|---|---|
| JP | 2010-58263 | A | 3/2010 |
| JP | 2010-169030 | A | 8/2010 |
| JP | 2010-269417 | A | 12/2010 |
| JP | 2012-88058 | A | 5/2012 |
| JP | 2013-518449 | A | 5/2013 |
| JP | 2016-121535 | A | 7/2016 |

\* cited by examiner

MACHINE LEARNING APPARATUS THAT LEARNS SETTING VALUE IN MACHINING PROGRAM OF MACHINE TOOL, AND MACHINING SYSTEM

RELATED APPLICATIONS

The present application claims priority to Japanese Patent Application No. 2016-204538 filed Oct. 18, 2016, the disclosure of which is hereby incorporated by reference herein in its entirety.

BACKGROUND OF THE INVENTION

1. Field of the Invention

The present invention relates to a machine learning apparatus and a machining system that includes the machine learning apparatus.

2. Description of the Related Art

In the related art, an impeller that generates the flow of air or converts the flow of air into rotation force is used in various devices. The impeller has a structure in which blade parts are attached to a base part including a rotation shaft. The impeller is manufactured by various methods.

Japanese Unexamined Patent Publication No. 2010-169030A discloses a method for manufacturing a propeller blade. This disclosed manufacturing method includes forming a tabular propeller blade by fixing a plurality of blades to a spider by laser welding and forming a stereoscopic propeller blade by bending the propeller blade.

A technique has recently been known in which machine learning is performed in manufacturing a predetermined product in order to optimize the manufacturing method.

Japanese Translation of PCT International Application Publication No. 2013-518449A discloses a learning system for optimizing performance of a semiconductor manufacturing tool through self-learning in the manufacturing tool.

Japanese Unexamined Patent Publication No. 7-164199A discloses a quality control device in which a pressure-bonding signal of a pressure sensor of a press machine is input to a computer including a neural network device and the computer displays the quality of a workpiece. This document also discloses that the press machine is operated and controlled by a control device connected to the computer.

SUMMARY OF THE INVENTION

A machine tool can machine a workpiece into a desired shape by cutting the workpiece while moving a tool relative to the workpiece. A method for manufacturing an impeller is known in which a machine tool cuts a single base material so as to manufacture an impeller. In this case, a base part and blade parts are produced by cutting a single member.

The impeller that has an imbalance vibrates or suffers a breakdown during rotation. Especially, the impeller that is used for a supercharger of an internal combustion engine of a vehicle or the like rotates at high speed. The allowable value of imbalance in the impeller that rotates at high speed is several mg which is very small. Thus, machining accuracy is significantly affected by an assembly error in the machine tool or thermal displacement of the machine tool.

The imbalance amount in a product may be reduced by measuring a mechanical error and the thermal displacement amount of the machine tool and adjusting a setting value that is included in a machining program. Unfortunately, it is difficult to configure the machining program, and the imbalance amount in a product may exceed the allowable value.

A machine learning apparatus of the present invention learns a setting value in a machining program of a machine tool configured to machine an impeller. The machine learning apparatus includes a state observation unit configured to acquire a thermal displacement amount during a period of machining a workpiece, as a state variable. The machine learning apparatus includes a determination data acquisition unit configured to receive an imbalance amount in the impeller after machining as determination data. The machine learning apparatus includes a learning unit configured to learn the setting value in the machining program on the basis of output from the state observation unit and output from the determination data acquisition unit.

In the above-described invention, the setting value in the machining program can include at least one of a position of an origin of a workpiece coordinate system and an intersection offset vector for two rotary axes.

In the above-described invention, the state observation unit can acquire an ambient temperature in the vicinity of the machine tool as the state variable.

In the above-described invention, a temperature detector can be attached to a predetermined member of the machine tool. The state observation unit can acquire a thermal displacement amount estimated on the basis of output from the temperature detector.

In the above-described invention, the machine learning apparatus can be connected with a plurality of machine tools. The learning unit can be configured to learn the setting value in the machining program for each machine tool and share information acquired through learning the machining programs of the plurality of machine tools.

A machining system of the present invention includes the above-described machine learning apparatus, a machine tool configured to machine a workpiece so as to produce an impeller; and an imbalance measuring machine configured to measure an imbalance amount in the impeller.

DETAILED DESCRIPTION

A machine learning apparatus of an embodiment and a machining system including the machine learning apparatus will now be described with reference to FIGS. 1 to 9. The machine learning apparatus of the present embodiment learns a setting value in a machining program of a machine tool. By using the setting value updated by the machine learning apparatus, the machine tool can form a workpiece in which the imbalance amount is small.

Figure 1:
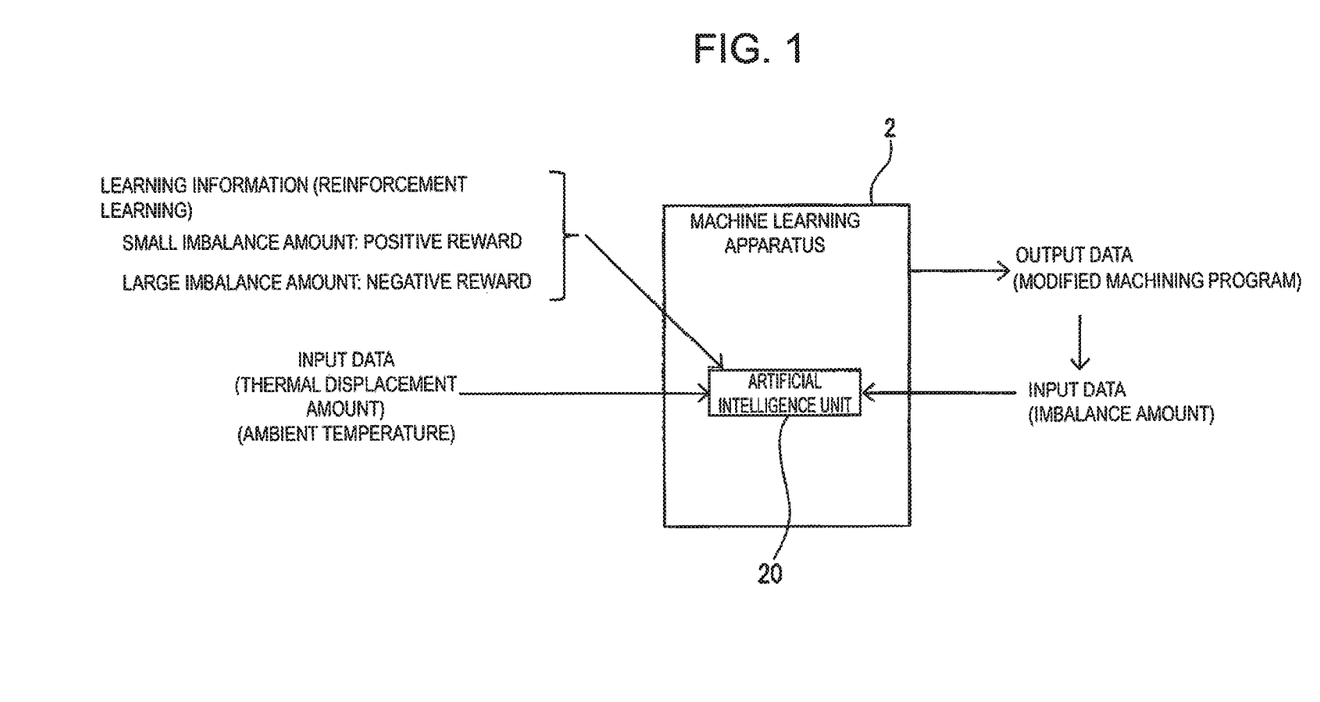
FIG. 1 is a schematic view of a machine learning apparatus of an embodiment.

FIG. 1 is a block diagram schematically illustrating one embodiment of the machine learning apparatus of the present embodiment. The machine learning apparatus 2 learns the machining program of the machine tool through reinforcement learning, for example, and outputs a modified machining program. The machine learning apparatus 2 includes an artificial intelligence unit 20. The machine learning apparatus 2 may be provided in a control device of each machine tool (edge), for example, or a fog server or the like may be provided for each plant (machining system) having a plurality of machine tools. Alternatively, the machine learning apparatus 2 may be provided in a cloud server that is connected to a plurality of plants through communication lines, such as the Internet.

When the machine learning apparatuses are individually provided for each machine tool, one machine learning apparatus and the other machine learning apparatus can be connected with each other, for example. The one machine learning apparatus can be directly connected with the other machine learning apparatus. The one machine learning apparatus and the other machine learning apparatus may exchange or share information acquired through machine learning with each other.

The artificial intelligence (AI) unit 20 can be formed, for example, by a neural network having a multilayer structure, or the like, which will be described later. The artificial intelligence unit 20 acquires the imbalance amount in a manufactured workpiece, the thermal displacement amount of the machine tool during the period of machining the workpiece, an ambient temperature of the machine tool, and the like. The artificial intelligence unit 20 performs learning (reinforcement learning) on the basis of the acquired external data. The artificial intelligence unit 20 determines a predetermined setting value in the machining program. The artificial intelligence unit 20 outputs a modified (learned) machining program. The machine tool is operated in accordance with the learned machining program and can thus manufacture, for example, an impeller in which the imbalance amount is small.

Figure 2:
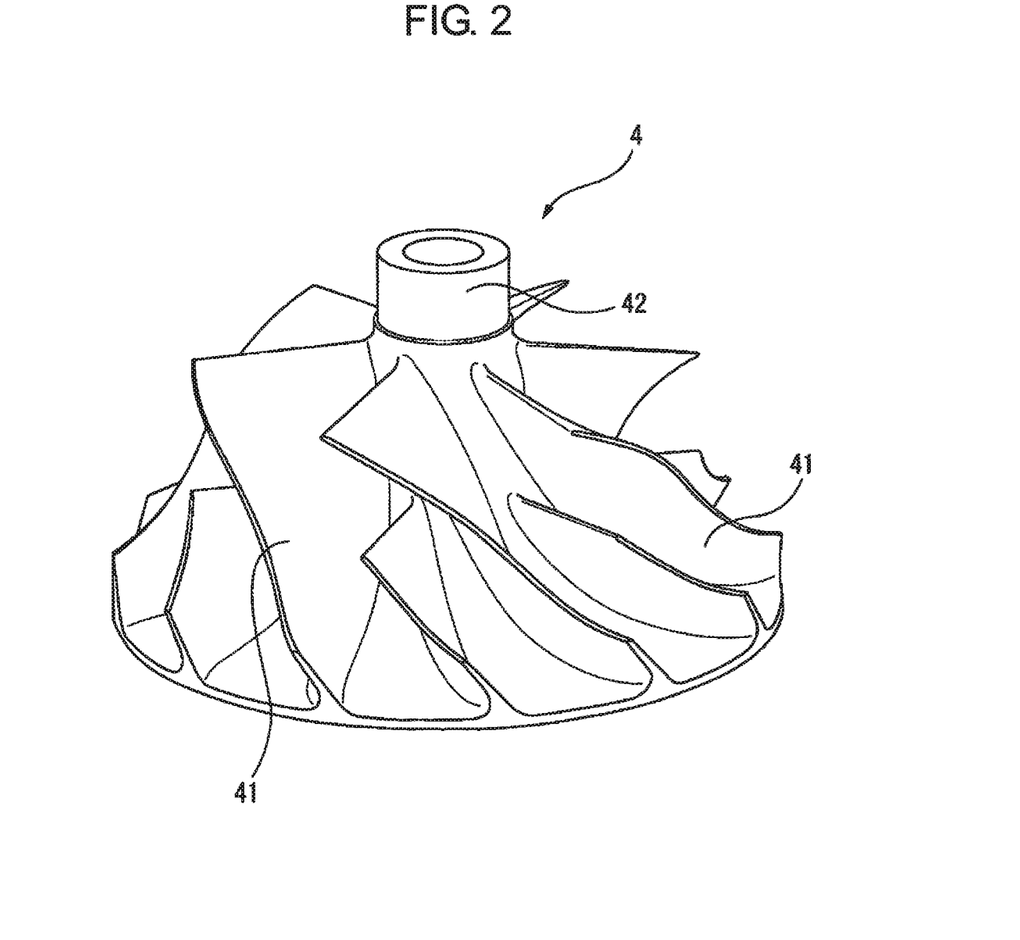
FIG. 2 is a perspective view of an impeller to be manufactured in the embodiment.

FIG. 2 shows a perspective view of an impeller that is manufactured in the present embodiment. The impeller 4 of the present embodiment is a component of a supercharger that is disposed in an internal combustion engine of a vehicle. The impeller 4 of the present embodiment is disposed in a compressor that is disposed in an intake path. The impeller 4 includes blade parts 41 that has curved shapes and a base part 42 that supports the blade parts 41. The impeller 4 of the present embodiment rotates at high speed during operation. For example, the impeller 4 rotates at rotational speeds of from 10000 rpm to 200000 rpm, both inclusive. In the present embodiment, the machine tool cuts a single base material so as to manufacture the impeller 4.

Figure 3:
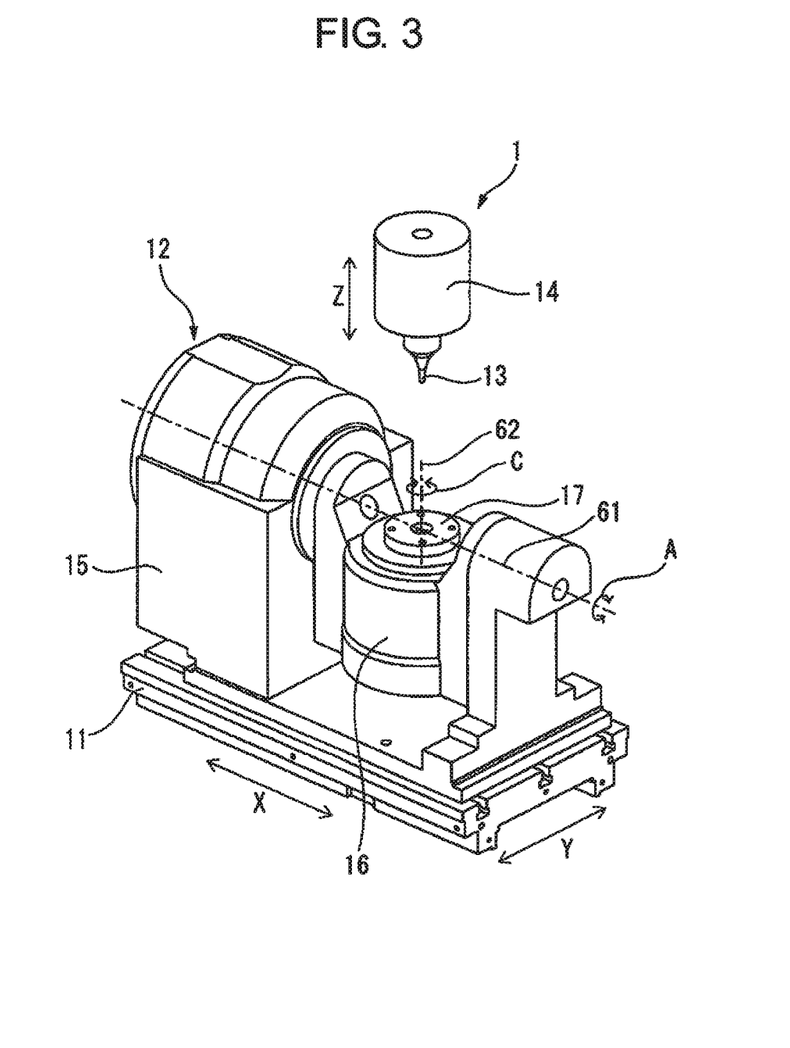
FIG. 3 is a perspective view of a main section of a machine tool of the embodiment.
Figure 4:
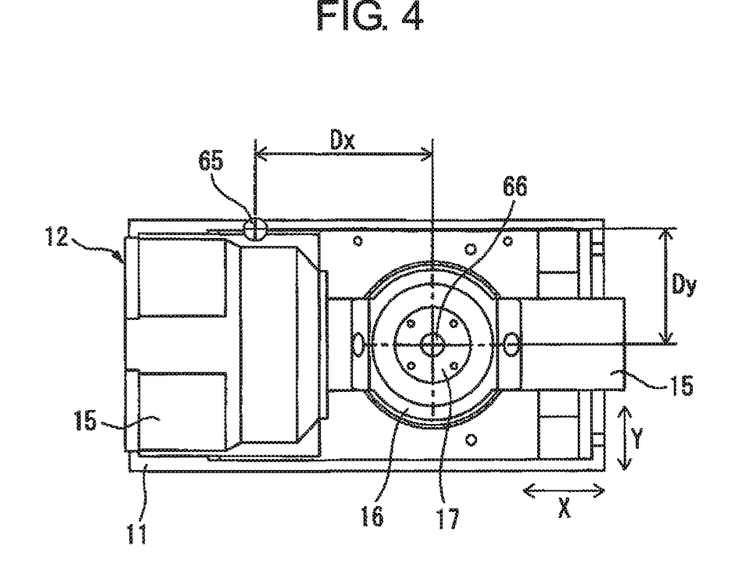
FIG. 4 is a plan view of the main section of the machine tool of the embodiment.
Figure 5:
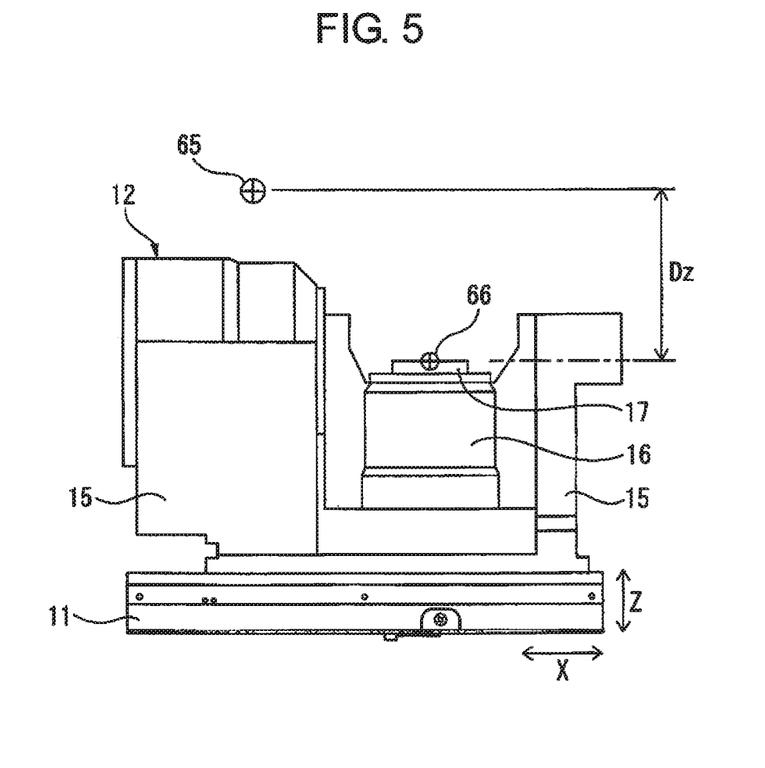
FIG. 5 is a side view of the main section of the machine tool of the embodiment.

FIG. 3 shows a perspective view of a main section of the machine tool of the present embodiment. FIG. 4 shows a plan view of a swivel base of the machine tool of the present embodiment. FIG. 5 shows a side view of the swivel base of the machine tool of the present embodiment. With reference to FIGS. 3 to 5, the machine tool 1 includes a table 11 and the swivel base 12 that is fixed to the table 11. The swivel base 12 functions as a fixing jig that fixes a workpiece.

The swivel base 12 includes a rotary table 17 to which the workpiece is fixed and a rocking member 16 that supports the rotary table 17. The swivel base 12 includes a support member 15 that supports the rocking member 16. The support member 15 is formed into a U shape when viewed from a side thereof. The support member 15 includes a pair of pillars, and the pillars support both ends of the rocking member 16. The support member 15 supports the rocking member 16 in a rockable manner.

The machine tool 1 includes a spindle head 14 that supports a tool 13. The spindle head 14 is formed so that the tool 13 rotates about the central axis of the tool. The spindle head 14 supports the tool 13 downward so that the tip of the tool 13 faces the rotary table 17.

An X axis, a Y axis, and a Z axis orthogonal to each other are set for the machine tool 1. Furthermore, an A axis around an axis line 61 extending parallel to the X axis is set for the machine tool 1. A C axis around an axis line 62 extending parallel to the Z axis is set for the machine tool 1.

The machine tool 1 includes a drive device that moves the tool relative to the workpiece along each of the feed axes. The drive device includes a servomotor that moves a corresponding member for each of the feed axes. In the machine tool 1 of the present embodiment, the drive device moves the table 11 in the X-axial direction and the Y-axial direction. The drive device moves the spindle head 14 in the Z-axial direction. The drive device includes ball screw mechanisms for moving predetermined members in the X-axial, Y-axial, and Z-axial directions. The ball screw mechanisms each include a screw shaft that has a thread on outer periphery surface and a nut that engages the screw shaft. The screw shaft rotates about the central axis thereof, and thereby the nut moves along the screw shaft.

The drive device includes a motor that rotates the rotary table 17 in the C-axial direction. The drive motor of the rotary table 17 of the present embodiment is disposed in the rocking member 16. The drive device includes a motor that rocks the rocking member 16 in the A-axial direction with respect to the support member 15. The motor that drives the rocking member 16 is disposed in the support member 15. The rotary table 17 moves together with the rocking member 16.

The machine tool 1 of the present embodiment includes the three linear motion axes orthogonal to each other and the rotary feed axes that rotate about the axis line of the A axis and the axis line of the C axis. The machine tool is not limited to this configuration, and an arbitrary machine tool including a linear motion axis and a rotary feed axis may be employed. For example, the spindle head 14 may be formed in a rockable manner while the rotary table 17 to which the workpiece is fixed does not rock.

The machine tool 1 of the present embodiment can cut the workpiece into the shape of the blade parts 41 of the impeller 4 while changing the inclination of the tool 13 with respect to the workpiece along the rotary feed axis. The machine tool 1 performs machining in accordance with the machining program (NC program) that is input to a control device 18.

Figure 6:
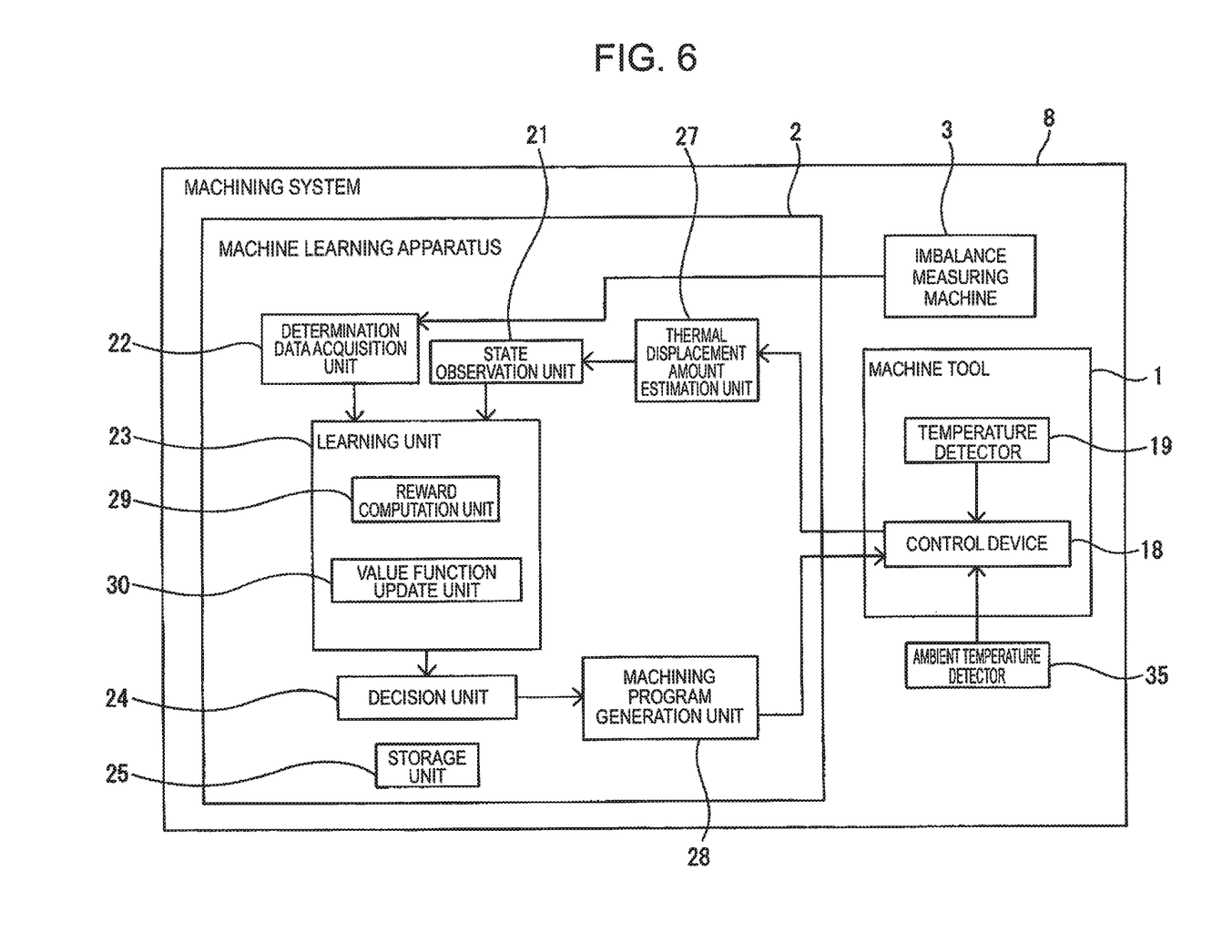
FIG. 6 is a block diagram of a machining system of the embodiment.

FIG. 6 shows a block diagram of the machining system of the present embodiment. The machining system 8 includes the machine tool 1 and the machine learning apparatus 2. The machine learning apparatus 2 of the present embodiment is constituted by an arithmetic processing device including a central processing unit (CPU), a random access memory (RAM), a read only memory (ROM), and the like, that are connected to one another via bus. The machine learning apparatus 2 of the present embodiment is constituted by the computer that performs a processing for learning. The machine learning apparatus 2 is not limited to this configuration. For example, the control device 18 of the machine tool 1 may have a learning function. That is, the control device 18 that controls the operation of the machine tool 1 may have the function of the machine learning apparatus 2. Alternatively, when a control device of another device is provided, the control device of the other device may include the function of the machine learning apparatus.

The machine learning apparatus 2 of the present embodiment is connected with the control device 18 of the machine tool 1 through a communication device. The control device 18 is constituted by an arithmetic processing device including a CPU, a RAM, and the like. The machine learning apparatus 2 can receive information on machining and transmit information on machining such as the machining program to the machine tool 1.

In the present embodiment, the machine tool cuts a workpiece in order to manufacture the impeller. The impeller of the present embodiment rotates at high speed, and the allowable value of the imbalance amount in the impeller is thus strictly set. The machine learning apparatus learns the setting value that is included in the machining program so as to reduce the imbalance amount. The machine learning apparatus can continue learning in order to determine a setting value which causes the imbalance amount to be reduced.

The setting value to be learned in the machining program in the present embodiment includes a position of an origin of a workpiece coordinate system. With reference to FIGS. 4 and 5, the origin 65 of the machine coordinate system is set for the machine tool 1. The origin 65 of the machine coordinate system is a point that does not move even when the spindle head 14, the table 11, and the rotary table 17 move. For the machine tool 1 of the present embodiment, an origin 66 of the workpiece coordinate system is set on the surface of the rotary table 17 to which the workpiece is fixed and at the center of rotation of the rotary table 17. The origin 66 of the workpiece coordinate system moves and rotates together with the workpiece. The position of the origin 66 of the workpiece coordinate system with respect to the origin 65 of the machine coordinate system is predetermined. For example, when the machine tool is in a predetermined basic state, the origin 66 is set apart from the origin 65 by a distance Dx in the X-axial direction, a distance Dy in the Y-axial direction, and a distance Dz in the Z-axial direction. The position of the origin 66 of the workpiece coordinate system in the machine coordinate system is set in the machining program. The position of the origin 66 of the workpiece coordinate system shifts from a designed position because of an error in assembling the machine tool 1 and thermal displacement during a machining period. The machine learning apparatus changes the setting value of the position of the origin of the workpiece coordinate system in the machining program.

The setting value in the machining program of the present embodiment also includes an intersection offset vector for two rotary axes. With reference to FIGS. 3 and 4, the machine tool 1 of the present embodiment includes the axis line 61 of the A axis and the axis line 62 of the C axis as the two rotary axes. The axis line 61 and the axis line 62 intersect with each other in the design of the machine tool. However, the axis line 61 and the axis line 62 may not intersect with each other because of an error in assembling the machine tool 1 and thermal displacement during the machining period. In the present embodiment, a vector from a predetermined point on the axis line 61 to a predetermined point on the axis line 62 is referred to as the intersection offset vector. That is, the intersection offset vector indicates the amount of shift and the direction of shift of the two rotary axes. The machine learning apparatus 2 changes the setting value of the intersection offset vector in the machining program.

With reference to FIG. 6, the machine learning apparatus 2 of the present embodiment includes a state observation unit 21, a determination data acquisition unit 22, a learning unit 23, and a decision unit 24. The machine learning apparatus 2 includes a storage unit 25 that stores desired information on learning. The learning unit 23 includes a reward computation unit 29 and a value function update unit 30.

The state observation unit 21 acquires the thermal displacement amount of the machine tool 1 during the period of machining the workpiece, as a state variable. The state observation unit 21 acquires the thermal displacement amount of a predetermined member. In the present embodiment, the state observation unit 21 acquires the thermal displacement amount of the spindle that holds the tool and the thermal displacement amount of the ball screw that is disposed at each drive shaft.

A temperature detector 19 is attached to each of the members of which the thermal displacement amount is estimated. The temperature detector 19 is attached to the spindle head of the machine tool and detects the temperature of the spindle. The temperature detector 19 is attached to the ball screw mechanism in each drive axis of the machine tool and detects the temperature of the screw shaft. The temperatures detected by the temperature detectors 19 are input to the control device 18.

The machine learning apparatus 2 includes a thermal displacement amount estimation unit 27 that calculates the thermal displacement amount. The thermal displacement amount estimation unit 27 receives information on the temperature that is detected by the temperature detectors 19 from the control device 18. The thermal displacement amount estimation unit 27 calculates the thermal displacement amount of each of the members in a predetermined direction on the basis of the temperature detected by the corresponding temperature detector 19.

For example, the spindle slightly expands or contracts depending on the temperature. The thermal displacement amount estimation unit 27 can estimate the thermal displacement amount of the spindle in the direction (Z direction) in which the spindle extends on the basis of the temperature of the spindle. Alternatively, the thermal displacement amount estimation unit 27 can estimate the thermal displacement amount in the direction in which the screw shaft extends on the basis of the temperature of the screw shaft in the ball screw mechanism. The state observation unit 21 receives the thermal displacement amount that is calculated by the thermal displacement amount estimation unit 27.

The method for estimating the thermal displacement amount is not limited to the above-described method. When a linear scale is disposed in the machine tool, for example, the thermal displacement amount may be acquired on the basis of output from the linear scale during the machining period. Alternatively, the thermal displacement amount estimation unit may estimate the thermal displacement amount on the basis of a state of the drive device, such as the rotational speed of the drive motor. For example, as an electric current supplied to the drive motor is larger, the temperature of the device for a predetermined drive axis increases. At this time, the thermal displacement amount estimation unit can estimate a greater thermal displacement amount. Alternatively, the thermal displacement amount estimation unit may estimate the thermal displacement amount on the basis of the movement amount in each drive axis. For example, as the movement amount in a predetermined axis is greater, the thermal displacement amount estimation unit estimates a greater thermal displacement amount.

The state observation unit 21 of the present embodiment can also observe the ambient temperature in the vicinity of the machine tool 1 as a state variable. An ambient temperature detector 35 is disposed in the vicinity of the machine tool 1. Output from the ambient temperature detector 35 is input to the control device 18. The state observation unit 21 acquires the ambient temperature in the vicinity of the machine tool 1 from the control device 18.

The determination data acquisition unit 22 receives the imbalance amount in the impeller after machining as determination data. The learning unit 23 learns a setting value in the machining program of the machine tool 1 on the basis of output from the state observation unit 21 and output from the determination data acquisition unit 22. The setting value in the machining program of the present embodiment includes at least one of the position of the origin of the workpiece coordinate system and the intersection offset vector for the two rotary axes.

The learning unit 23 includes the reward computation unit 29 and the value function update unit 30. The reward computation unit 29 computes a reward on the basis of the output from the determination data acquisition unit 22. Alternatively, the reward computation unit 29 may compute a reward on the basis of the output from the state observation unit 21. The value function update unit 30 updates a value function that defines value of the setting value in the machining program on the basis of the output from the state observation unit 21, the output from the determination data acquisition unit 22, and output from the reward computation unit 29. The decision unit 24 determines the setting value in the machining program for machining a subsequent workpiece on the basis of the value function that is updated by the value function update unit 30.

The machine learning apparatus 2 includes a machining program generation unit 28 that generates the machining program of the machine tool. The machining program generation unit 28 updates the machining program on the basis of the setting value that is set by the decision unit 24. The updated machining program is transmitted to the control device 18 of the machine tool 1. The machine tool 1 performs machining on the subsequent workpiece in accordance with the updated machining program.

The machining system 8 of the present embodiment includes an imbalance measuring machine 3 serving as a dynamic balance test machine. The imbalance measuring machine 3 can measure the imbalance amount in the impeller. The imbalance measuring machine 3 of the present embodiment is a vertical two-plane dynamic balance test machine. The distance from the center of rotation of the impeller to the center of gravity and the phase of the center of gravity can be employed as the imbalance amount.

The imbalance measuring machine 3 of the present embodiment includes a fixing pin supporting the impeller 4. The fixing pin is placed into the impeller 4, and as a result, the impeller 4 is supported rotatably. Air is supplied from below the impeller 4, whereby the impeller 4 floats. In the state in which the impeller 4 is floating, air is blown to the blade parts 41 of the impeller 4 so as to rotate the impeller 4. A mark serving as a reference for the phase is put on the back surface of the impeller 4. The rotational speed of the impeller can be measured by a laser sensor detecting the mark. Furthermore, the rotational speed measured by the laser sensor is fed back so as to adjust the quantity of air to be collided with the blade parts. During the measurement of the imbalance amount, the rotational speed of the impeller is maintained constant.

An operator prepares a reference impeller in order to measure the imbalance amount. The reference impeller is formed so that the imbalance amount therein is very small. A weight having a predetermined weight is fixed at a predetermined radial position with respect to the center of rotation of the reference impeller. Next, the reference impeller is placed in the imbalance measuring machine. The imbalance measuring machine acquires an oscillatory waveform of the reference impeller while the reference impeller is rotating. This oscillatory waveform is a reference oscillatory waveform. The imbalance measuring machine stores the reference oscillatory waveform.

In order to measure the imbalance amount in the manufactured impeller, the imbalance measuring machine measures the oscillatory waveform of the manufactured impeller. The imbalance measuring machine can calculate an actual imbalance amount in the manufactured impeller on the basis of the reference oscillatory waveform and the oscillatory waveform of the manufactured impeller.

Note that the imbalance measuring machine is not limited to the above-described configuration, and an arbitrary measuring machine that can measure the imbalance amount in a workpiece can be employed.

The machine learning apparatus has the function of extracting useful regularity, knowledge representation, criteria and the like from the aggregate of data input to the apparatus by analysis, outputting the results of the determination, and performing knowledge learning (machine learning). There are various machine learning techniques, which are broadly classified into "supervised learning", "unsupervised learning", and "reinforcement learning", for example. Furthermore, in order to implement these techniques, a technique called "deep learning" is available that learns extraction of a feature quantity itself.

Note that "reinforcement learning (Q-learning)" is applied to the machine learning apparatus 2 that is illustrated in FIG. 6. A general-purpose computer or processor can be used for the machine learning apparatus 2. Alternatively, when general-purpose computing on graphics processing units (GPGPU), a large scale PC cluster, or the like is applied to the machine learning apparatus 2, for example, the processing can be performed at high speed. An overview of machine learning will now be described briefly.

First, supervised learning is a technique in which a machine learning apparatus is provided with a large amount of supervised data, that is, data pairs in which each pair is constituted by input and result (label) data, then learns features in the data sets, and inductively acquires a model for estimating a result from an input (error model), that is, the relationship therebetween. This technique can be implemented with, for example, an algorithm, such as a neural network, which will be described later.

Unsupervised learning is a technique in which a machine learning apparatus is provided with a large amount of input data only, then learns how the input data is distributed, and learns a method of compression, classification, format, and the like of the input data even when the corresponding supervised output data is not provided. For example, the machine learning apparatus can cluster features in the data sets into groups of similar types. The machine learning apparatus uses the result so as to set some standard and allocates output so as to optimize the standard, thereby prediction of output can be performed.

There is also a technique called semi-supervised learning, which is an intermediate technique of problem that is set between unsupervised learning and supervised learning. This technique corresponds to the case in which some input and output data pairs are available and only input data is available for the rest, for example.

Next, reinforcement learning will be described. First, problem setting for reinforcement learning is considered as follows:

A machining system (including a control device of a machine tool and a machine learning apparatus, for example) observes a state of environment and determines an action.

The environment changes in accordance with some rule, and furthermore an action of itself may change the environment.

Each action returns a reward signal.

The variable to be maximized is the total (discounted) reward that is obtained in the future.

Learning starts in a state in which a result caused by an action is completely unknown or incompletely known. That is, the machine learning apparatus actually performs an action first, and then can acquire the result of the action as data. This indicates that it is necessary to search for an optimal action by trial and error.

Learning may start from a good starting point in such an initial state that preliminary learning (techniques such as aforementioned supervised learning and inverse reinforcement learning) has been performed so as to mimic human actions.

Here, reinforcement learning (Q-learning) is a technique that learns actions as well as determination and classification so as to learn an appropriate action in consideration of interaction provided to the environment by an action, that is, the technique that learns the method for maximizing the reward acquired in the future. Q-learning is exemplified in the following description, however, the invention is not limited to the case to which the Q-learning is adopted.

The Q-learning is a method for learning value Q(s, a) for selecting an action a under a given environment state s. That is, the action a that has highest value Q(s, a) is selected as an optimal action in the given state s. However, a correct value of value Q(s, a) for a combination of the state s and the action a is completely unknown in the beginning. Thus, an agent (a subject of actions) selects various actions a under the given state s, and a reward is provided to each of the selected actions a. In this way, the agent learns selection of a better action, that is, correct value Q(s, a).

Furthermore, in order to maximize the total of rewards acquired in the future as a result of actions, the final objective is to satisfy the equation: Q(s, a)=E[Σ(γ$^t$)r$_t$]. Here, expectation value is acquired when a state changes in response to an optimal action. The expectation value, which is unknown, is learned through search. The update equation of value Q(s, a) is represented by, for example, the following Equation (1):

$$Q(s_t, a_t) \leftarrow Q(s_t, a_t) + \alpha \left( r_{t+1} + \gamma \max_a Q(s_{t+1}, a) - Q(s_t, a_t) \right) \quad (1)$$

In the Equation (1), $s_t$ represents the state of the environment at time t, and $a_t$ represents the action at time t. The state is changed to $s_{t+1}$ by the action $a_t$. The reward that is acquired by the change of the state is represented by $r_{t+1}$. The term with "max" is a Q value that is multiplied by γ when the action a that has the highest known Q value is selected under the state $s_{t+1}$. Here, γ is a parameter of 0<γ≤1, called discount factor. Symbol α is a learning coefficient in the range of 0<α≤1.

The above-described Equation (1) represents a method for updating the evaluation value $Q(s_t, a_t)$ of the action $a_t$ in the state $s_t$ on the basis of the reward $r_{t+1}$ that is returned as a result of the action $a_t$. That is, this indicates that if the sum of the reward $r_{t+1}$ and an evaluation value $Q(s_{t+1}, \max a_{t+1})$ of the best action max a in a subsequent state caused by the action a is greater than the evaluation value $Q(s_t, a_t)$ of the action a in the state s, $Q(s_t, a_t)$ is increased. In contrast, if the sum is less than the evaluation value $Q(s_t, a_t)$, $Q(s_t, a_t)$ is decreased. In other words, value of a given action in a given state is brought closer to a reward immediately returned as a result and value of the best action in a subsequent state caused by the given action.

Here, Q(s, a) is represented on a computer by a method in which the values of all state and action pairs (s, a) are stored in a table or by a method in which a function of approximating Q(s, a) is prepared. By the latter method, the above-described Equation (1) can be achieved by adjusting a parameter of an approximate function by a technique such as stochastic gradient descent. A neural network, which will be described later, can be used for the approximate function.

Figure 7:
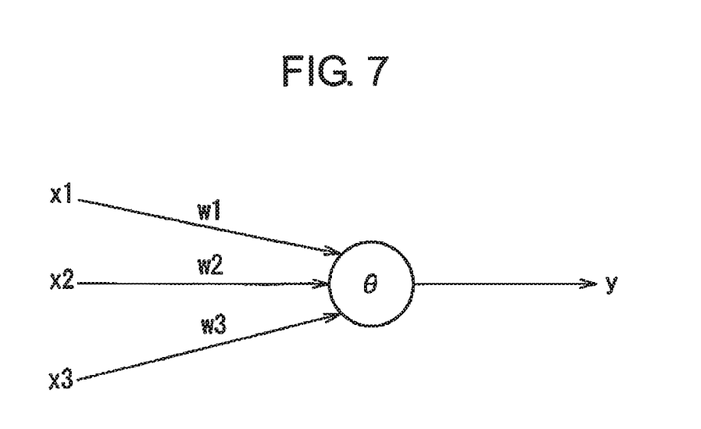
FIG. 7 is a diagram schematically illustrating a neuron model.
Figure 8:
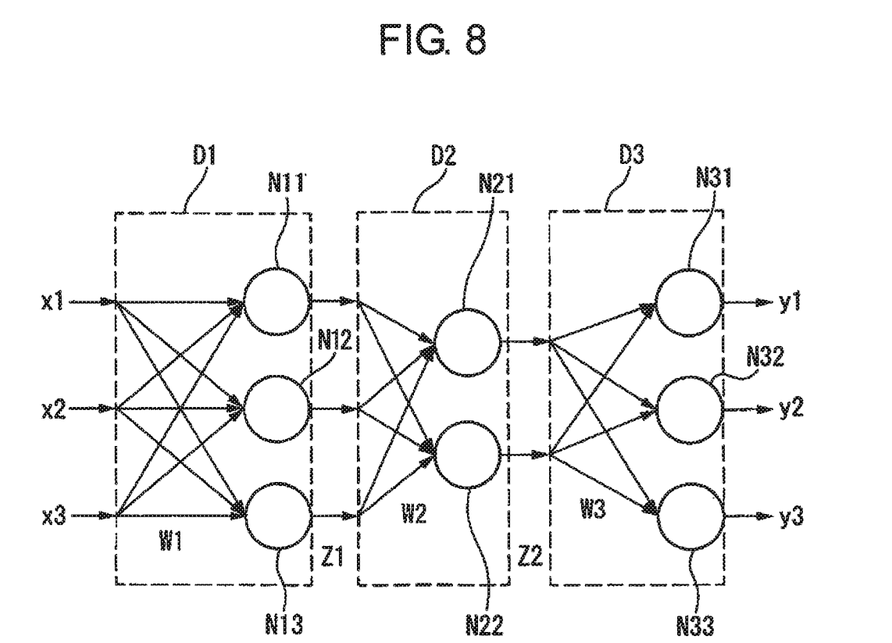
FIG. 8 is a diagram schematically illustrating a three-layer neural network constituted by a combination of single neurons.

The neural network can be used for an approximate algorithm of the value function in reinforcement learning. FIG. 7 is a diagram schematically illustrating a neuron model, and FIG. 8 is a diagram schematically illustrating a three-layer neural network constituted by a combination of neurons illustrated in FIG. 7. That is, the neural network is constituted by, for example, an arithmetic device, a memory, and the like that simulate a neuron model as illustrated in FIG. 7.

As illustrated in FIG. 7, the neuron outputs an output (result) y for a plurality inputs x (inputs x1 to x3 in FIG. 7 as an example). Each of the inputs x (x1, x2, x3) is multiplied by respective weights w (w1, w2, w3) that corresponds to the inputs x. By adopting this process, the neuron outputs the result y represented by Equation (2) below. Note that each of the inputs x, the result y, and the weights w is a vector. In the following Equation (2), θ is a bias, and $f_k$ is an activation function.

$$y = f_k(\Sigma_{i=1}^n x_i w_i - \theta) \quad (2)$$

With reference to FIG. 8, the three-layer neural network constituted by a combination of the neurons illustrated in FIG. 7 will now be described. As illustrated in FIG. 8, a plurality of inputs x (here, an input x1 to input x3 as an example) are input from the left side of the neural network, and results y (here, a result y1 to result y3 as an example) are output from the right side. Specifically, the inputs x1, x2, x3 are multiplied by the respective weights and are then input to respective three neurons N11 to N13. The weights that are used for the multiplication of these inputs are represented by W1 in the aggregate.

The neurons N11 to N13 output z11 to z13, respectively. In FIG. 8, z11 to z13 are represented by a feature vector Z1 in the aggregate, that can be regarded as a vector resulting from extraction of the quantity of features of the input vectors. This feature vector Z1 is a feature vector between the weight W1 and the weight W2. z11 to z13 are multiplied by the respective weights and are then input to two neurons N21 and N22. The weights for the multiplication of these feature vectors are represented by W2 in the aggregate.

The neurons N21, N22 output z21, z22, respectively. In FIG. 8, z21, z22 are represented by a feature vector Z2 in the aggregate. This feature vector Z2 is a feature vector between the weight W2 and a weight W3. z21, z22 are multiplied by the respective weights and are then input to each of three neurons N31 to N33. The weights for the multiplication of these feature vectors are represented by W3 in the aggregate.

Lastly, the neurons N31 to N33 output the result y1 to the result y3, respectively. The neural network operates in a learning mode and a value prediction mode. For example, the weight W is learned with a learning data set in the learning mode, and an action of the control device is determined with the parameter in the prediction mode. The term "prediction" is used for convenience; however, it should be noted that various tasks, such as detection, classification, and inference, can be achieved.

Here, data acquired by actually operating the control device of the machine tool in the prediction mode can be immediately learned and reflected in a subsequent action (online learning). Alternatively, learning is performed with all data groups that are collected in advance, and from then on, a detection mode may be performed with the parameter (batch learning). Alternatively, the learning mode can be interposed every time when a certain amount of data is accumulated, which is an intermediate technique between the above two techniques.

The weights W1 to W3 can be learned by the backpropagation method. Information on an error enters from the right side and is transferred to the left side. The Backpropagation method is a technique that adjusts (learns) the weight for each of neurons so as to reduce a difference between output y when input x is input and true output y (teacher). The number of layers of such a neural network may be increased to be three or more (called deep learning). An arithmetic unit that extracts features of input in stages and returns results may be automatically acquired only with supervised data.

With reference to FIG. 6, the machine learning apparatus 2 of the present embodiment includes the state observation unit 21, the determination data acquisition unit 22, the learning unit 23, and the decision unit 24, in order to perform reinforcement learning. An act of machining a workpiece with one setting value in the machining program corresponds to an action. Note that the machine learning method applied to the present invention is not limited to reinforcement learning. The machine learning apparatus 2 can be achieved by, for example, applying GPGPU, a large scale PC cluster, or the like as described above.

Figure 9:
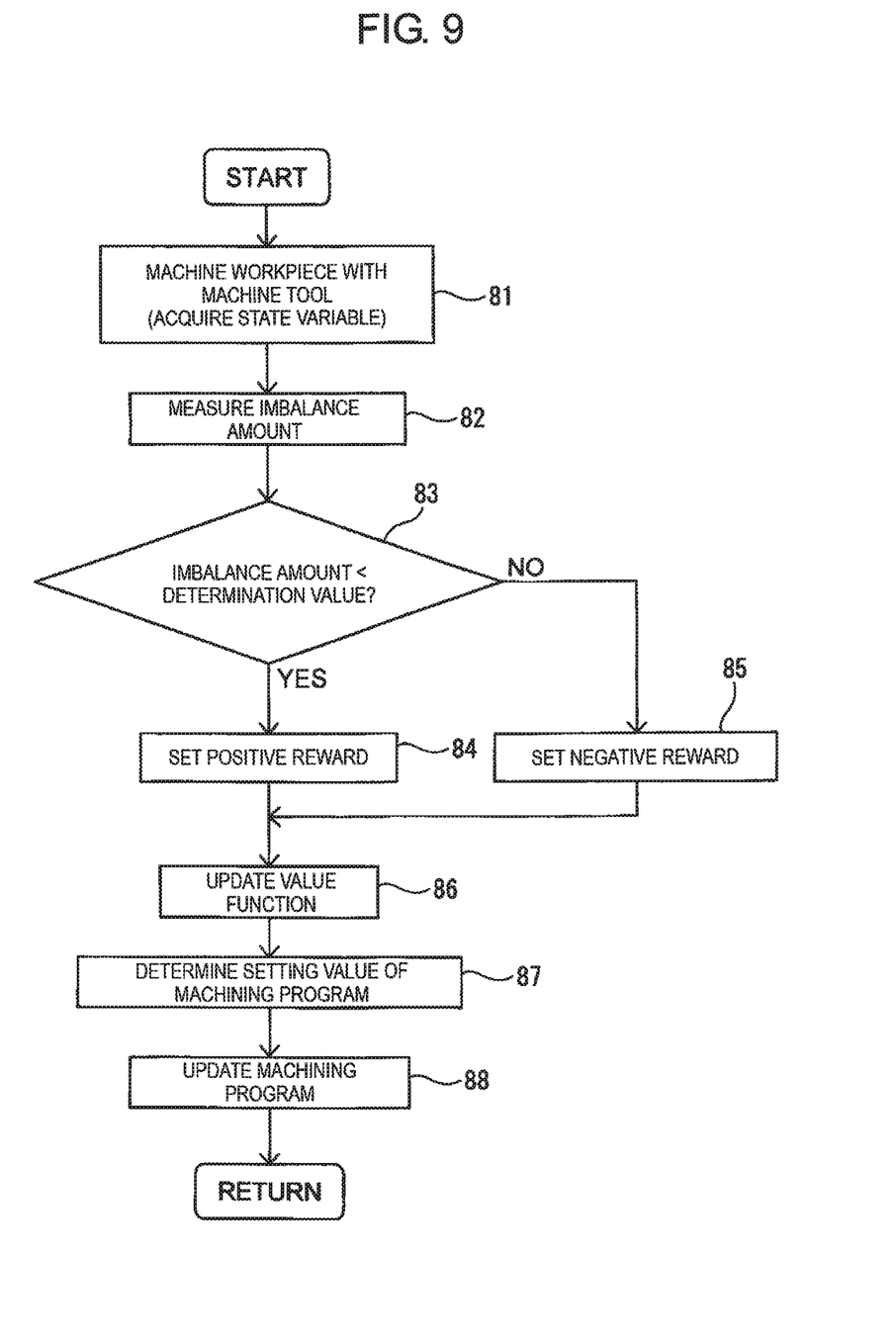
FIG. 9 is a flowchart of control of the machine learning apparatus of the embodiment.

FIG. 9 shows an example of a flowchart for control of the machine learning apparatus of the present embodiment. The control illustrated in FIG. 9 is exercised every time when one workpiece is machined, for example. The machine learning apparatus performs the learning on the basis of a result of machining of the previous workpiece. The machine learning apparatus can generate a machining program for current machining and perform current machining.

With reference to FIGS. 6 and 9, in step 81, a workpiece is machined with the machine tool using a machining program that is generated by the machine learning apparatus 2. For the first machining, the machining program that includes a predetermined setting value can be used. In step 81, the state observation unit 21 acquires the state variable during the period of machining the workpiece. The state observation unit 21 of the present embodiment acquires the thermal displacement amount of a predetermined portion of the machine tool.

The thermal displacement amount can be continuously acquired during the machining period. The thermal displacement amount may change during the machining period. In the present embodiment, the average value of the thermal displacement amount during the machining period is used. The thermal displacement amount to be employed is not limited to this value, and an arbitrary thermal displacement amount may be employed. For example, the maximum value in the machining period may be employed as the thermal displacement amount.

In step 82, after the machining, the imbalance measuring machine 3 measures the imbalance amount in the manufactured workpiece. The determination data acquisition unit 22 acquires the imbalance amount from the imbalance measuring machine 3.

In step 83, the reward computation unit 29 of the learning unit 23 determines whether or not the imbalance amount in the workpiece is less than a predetermined determination value. If the imbalance amount in the workpiece is less than the determination value, the control proceeds to step 84. In step 84, the reward computation unit 29 sets a positive reward.

In step 83, if the imbalance amount in the workpiece is equal to or greater than the determination value, the control proceeds to step 85. In step 85, the reward computation unit 29 sets a negative reward. Note that the reward computation unit 29 can exercise any controls so that when the imbalance amount is smaller, the value of the reward is set to greater value. For example, the reward computation unit may set any of the reward that has a value of zero or the reward that has a positive value. Alternatively, the reward computation unit 29 may exercise the control so as to gradually increase the value of a reward as the imbalance amount is smaller.

Next, in step 86, the value function update unit 30 of the learning unit 23 updates the value function with the set reward. In step 87, the decision unit 24 determines a setting value in the machining program on the basis of the updated value function. Next, in step 88, the machining program generation unit 28 updates the machining program on the basis of the newly determined setting value. The machine learning apparatus 2 transmits the updated machining program to the control device 18 of the machine tool 1. Thereafter, the control returns to step 81, and a new workpiece is machined with the updated machining program.

In this way, the machine learning apparatus 2 can determine the setting value in the machining program of the machine tool 1. The machining program is updated every time when the workpiece is machined.

One machine control device is connected with one machine tool in the present embodiment; however, the invention is not limited to this configuration. The machine learning apparatus can be connected with a plurality of machine tools. The machine learning apparatus can be configured to learn the setting value in the machining program for each of the machine tools. That is, the machine learning apparatus can set the setting value in the machining program for each of the machine tools. The machine learning apparatus can share information acquired through learning the machining program for one machine tool and information acquired through learning the machining program for another machine tool.

For example, the learning unit can share the value function between the machine tools. The decision unit can select the setting value in the machining program with which the imbalance amount is smallest in a predetermined period. The setting value can be used in the machining program for the machine tool. This control can efficiently reduce the imbalance amount by using information on the machine tools.

In the present embodiment, the manufacture of the impeller that is disposed in the compressor of the supercharger in the internal combustion engine is exemplified; however, the invention is not limited to this embodiment. An arbitrary impeller that rotates at high speed may be employed as the workpiece that is manufactured by the machine tool. For example, an impeller that is disposed in a turbine on the exhaust side of a supercharger of the internal combustion engine may be employed. Alternatively, an impeller that is disposed in a supercharger of an internal combustion engine for a marine vessel or an aircraft may be employed. Alternatively, an impeller that rotates at high speed is attached to a vacuum cleaner in which a centrifugation action is used. The present invention can also be applied to manufacture of an impeller that is attached to such a vacuum cleaner.

The present invention can provide the machine learning apparatus that learns a setting value of the machining program for the machine tool so as to reduce the imbalance amount of the impeller and the machining system including the machine learning apparatus.

The above-described embodiments may be combined appropriately. The same or equivalent components have the same reference signs in the aforementioned drawings. The above-described embodiments are examples and do not limit the invention. The embodiments include modification of embodiments that are indicated in the appended claims.

The invention claimed is:

1. A machine learning apparatus configured to learn a setting value in a machining program of a machine tool configured to machine an impeller, the machine learning apparatus comprising:
   a processor configured to
      acquire a thermal displacement amount during a period of machining a workpiece, as a state variable,
      receive an imbalance amount in the impeller after machining as determination data, and
      learn the setting value in the machining program on the basis of the state variable and the determination data.

2. The machine learning apparatus according to claim 1, wherein the setting value in the machining program includes at least one of a position of an origin of a workpiece coordinate system and an intersection offset vector for two rotary axes.

3. The machine learning apparatus according to claim 1, wherein the processor is further configured to acquire an ambient temperature in a vicinity of the machine tool as the state variable.

4. The machine learning apparatus according to claim 1, wherein:
   a temperature detector is attached to a predetermined member of the machine tool, and
   the processor is further configured to acquire the thermal displacement amount estimated on the basis of output from the temperature detector.

5. The machine learning apparatus according to claim 1, the machine learning apparatus being connected with a plurality of machine tools, wherein:
   the processor is further configured to
      learn the setting value in the machining program for each machine tool among the plurality of machine tools, and
      share information acquired through learning the machining programs of the plurality of machine tools.

6. A machining system, comprising:
   a machine learning apparatus;
   a machine tool configured to machine a workpiece so as to produce an impeller; and
   an imbalance measuring machine configured to measure an imbalance amount in the impeller, wherein
   the machine learning apparatus is configured to learn a setting value in a machining program of the machine tool, the machine learning apparatus comprising a processor configured to
      acquire a thermal displacement amount during a period of machining the workpiece, as a state variable,
      receive the imbalance amount in the impeller after machining as determination data, and
      learn the setting value in the machining program on the basis of the state variable and the determination data.

* * * * *